July 29, 1958 J. H. OSGOOD 2,845,589
ELECTRONIC TABLE MOTOR DRIVE UNIT FOR
OPTICAL COMPARATORS AND THE LIKE
Filed July 7, 1955 4 Sheets-Sheet 1

Fig.1.

INVENTOR.
John H. Osgood
BY
Wm O Moser
ATTORNEY.

July 29, 1958 J. H. OSGOOD 2,845,589
ELECTRONIC TABLE MOTOR DRIVE UNIT FOR
OPTICAL COMPARATORS AND THE LIKE
Filed July 7, 1955 4 Sheets-Sheet 2

INVENTOR.
John H. Osgood
BY
ATTORNEY.

United States Patent Office 2,845,589
Patented July 29, 1958

2,845,589

ELECTRONIC TABLE MOTOR DRIVE UNIT FOR OPTICAL COMPARATORS AND THE LIKE

John H. Osgood, Charlestown, N. H., assignor to Jones and Lamson Machine Company, a corporation of Vermont Application July 7, 1955, Serial No. 520,583

5 Claims. (Cl. 318—257)

The present invention relates to optical comparators and the like, and more particularly to means for raising, lowering, or otherwise moving the work table of such devices with respect to the optical system therein.

In inspection and measurement devices of the comparator type it is well known that the work table must be moved to bring the object to be inspected or measured to an exact viewing or measuring point in the light beam. Heretofore this has been accomplished generally by manual operation of handwheels, involving considerable time and manual effort. Where set-ups are constantly being changed or where successive jobs of inspection involve frequent adjustments of the work table, power operation is desirable.

However, the problem of moving or adjusting the work table more effectively further involves a consideration of speed as well as end point precision in positioning the object to be viewed or inspected. This is for the reason that in measurement operations of this type, precise and relatively slow movement of the object by as little as one ten-thousandths of an inch may be required. The combination of rapid movement and relatively slow and precise adjustment of the work table for this purpose has heretofore been difficult of attainment.

It is accordingly, an object of this invention, to provide an improved manually controllable, power-operated, moving means for optical comparator work tables and the like, which operates selectively in either direction rapidly or more slowly down to relatively low increments of movement, in response to operation of a single manual control element which gives a sense of both direction and speed of operation.

It is a further object of this invention, to provide an improved electronic elevating unit for attachment to optical comparators and the like, for power operation of an elevating hand wheel or the like, selectively in either direction with manual control and with substantially the same response for a given incremental movement of the manual control in either direction.

It is also an object of this invention, to provide an improved electronic, variable speed, table moving system for optical comparators and the like, which is responsive to movement of a single manually operable control knob or lever, and which may operate to raise and lower the work table, or object to be inspected or measured, rapidly and then slowly to an exact measuring point in increments as low as of the order of .0001 of an inch.

It is a still further and important object of this invention to provide an improved electronic elevating control system for optical comparators and the like, which embodies improved motor control circuits for operation from commercial alternating current and which may be constructed as an enclosed and compact unit for attachment to existing comparator equipment.

It is another object of this invention to provide a self-contained, electronically-controlled electric motor drive system for optical comparator work tables and the like, which gives reversible relatively wide range variable speed operation and sense of operation in response to movement of a single control element in direction and degree from a predetermined neutral position.

In accordance with the invention, the elevating hand wheel or other rotary element for controlling the positioning of the work table of an optical comparator or the like, is arranged to be driven through speed reducing means from a reversible, variable speed, electric motor which is placed under control of a hand knob or lever which may be rotated or displaced in varying degree in either of two directions from a neutral position of rest toward which it is biased at all times.

The circuit control of the motor is arranged to provide (1) a directional sense for up and down movement of the table, and (2) a variable speed of movement of the table. The control element for the circuit may be a potentiometer having a center tap and a movable contact having approximately 270° range of movement. The movable contact is connected with the knob or lever by geared or similar connection means for imparting a relatively wide range of movement, such as a 270° range for the potentiometer contact, in response to a relatively smaller angular movement of the control knob or lever from the neutral position.

The improved and simplified circuitry comprising power supply circuits for the motor and control connections for said power supply circuits are arranged, with the motor, to be attached as a unit to the comparator, and with the control knob or lever positioned for easy operation when viewing the screen.

In a preferred embodiment of the invention, the unit cosists of a variable speed direct-current motor connected through a reduction gearing as with a friction pulley, for example, in contact with the hand wheel or other elevation control element. The position of the work table and of the object being inspected is easily and precisely adjusted up or down by the speed control knob or lever. This is connected with the potentiometer which is housed on an extension of the knob or lever shaft. This control provides for fast movement as well as the high degree of sensitivity required for the final precise adjustment of the work table. Limit switches are provided for preventing overtravel of the work table in both the up and down directions.

Because of the mass and weight of the work table and connected table column or vertical shaft, more power or a higher voltage is required to move the table upwardly than is required for moving it in a downward direction. An improved control circuit has, therefore, been provided in accordance with the invention, for compensating for the effect of gravity on the operation of raising and lowering the work table, so that the manual control knob or lever provides the same "feel" for up as for down movement, that is, for a given angular movement of the control lever or knob in either direction, the speed of the work table movement and of the work is substantially the same.

With the improved control circuit, the same control knob or lever movement results in substantially the same speed in either direction by reason of less voltage or power being applied to the driving motor in the downward direction. This is effected by means of a gravity balancing impedance or resistor in the "down" branch or arm of the control potentiometer circuit by which bias potential for a power rectifier is controlled.

The electric motor is preferably of the direct-current type, and is provided with operating current through the rectifier which is of the grid controlled, gas-filled type. A negative threshold bias and a positive operating bias with phase shift of anode vs. grid voltage, is arranged to control the duration of current flow through the rectifier and through the series field and armature for each positive half cycle of the alternating current supply, and thus to control the motor speed.

The motor is provided with both shunt and series fields, and the armature current is reversed by suitable relays under control of contact elements provided in connection with the potentiometer. These elements are arranged to be actuated in response to movement of the control knob or lever from the neutral position, in one direction and not in the other. By this simplified circuit, the motor is connected to provide the proper direction of operation to raise or lower the work table, instantly the control knob or lever is moved from the neutral position.

The novel features that are considered to be characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
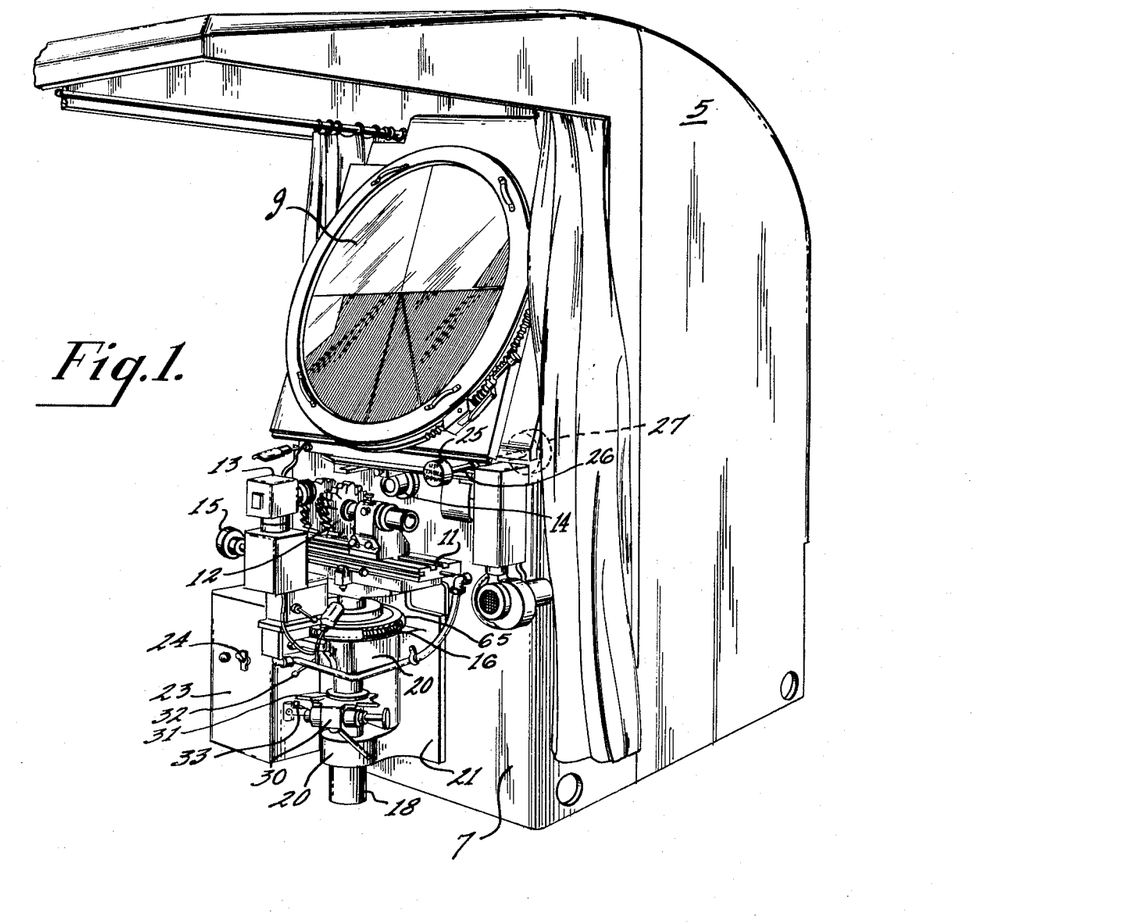
Figure 1 is a front view in perspective, of an optical comparator provided with an electronic elevating unit embodying the invention.

Referring now to the drawings, wherein like elements throughout are designated by like reference numerals, and referring more particularly to Figure 1, a large type optical comparator 5 is provided with a casing 7, on the frontal portion of which is provided an enlarged optical viewing screen 9 of circular configuration, and a work table 11 on which is mounted an object 12 to be measured or inspected. The object is movable for proper positioning between a high intensity illuminating unit 13 and the projection lens 14 of the comparator. For this purpose the table 11 is movable transversely by suitable means such as a hand wheel 15, and vertically by means of a vertical hand wheel 16. As the hand wheel 16 is rotated, the table column or vertical shaft 18 is caused to move up or down depending upon the direction of rotation of the hand wheel 16. The shaft or table column 18 is journaled in suitable bearings 20—20 mounted on a bracket 21 attached to the casing 7 of the comparator.

The vertical hand wheel 16 is arranged to be operated by an electronic elevating unit 23 which is mounted on the face of the casing 7 at one side of the table column. The unit is arranged to be connected directly with the hand wheel 16 and is provided with a power switch 24. The unit 23 and operation of the hand wheel 16 is under the control of a rotary control knob 25 extending forwardly on the front of the comparator in a position for easy operation when viewing the screen 9. The knob 25 is connected through a shaft 26 with a control potentiometer unit 27 which is mounted in the interior of the casing 7 and connected electrically with the control unit 23. The control knob 25 is biased to an intermediate or neutral position of rest from which it is movable over a limited arc or range and provides both variable speed and directional control of the hand wheel 16 through the electronic unit 23 and the potentiometer unit 27 to effect rapid and precise vertical adjustment of the work table 11 and the specimen or object 12 as desired.

For limiting the vertical movement of the work table, whereby it is prevented from overtraveling during adjustment, limiting switch means are provided and arranged to be actuated by an element attached to the table column or shaft 18. In the present example, the table column 18 is provided with a spindle clamp or attachment 30 which moves with the column 18 and carries a limit switch actuating plate 31 positioned to engage the operating levers 32 and 33 of two limit switches within the unit 23 and hereinafter described.

Figure 2:
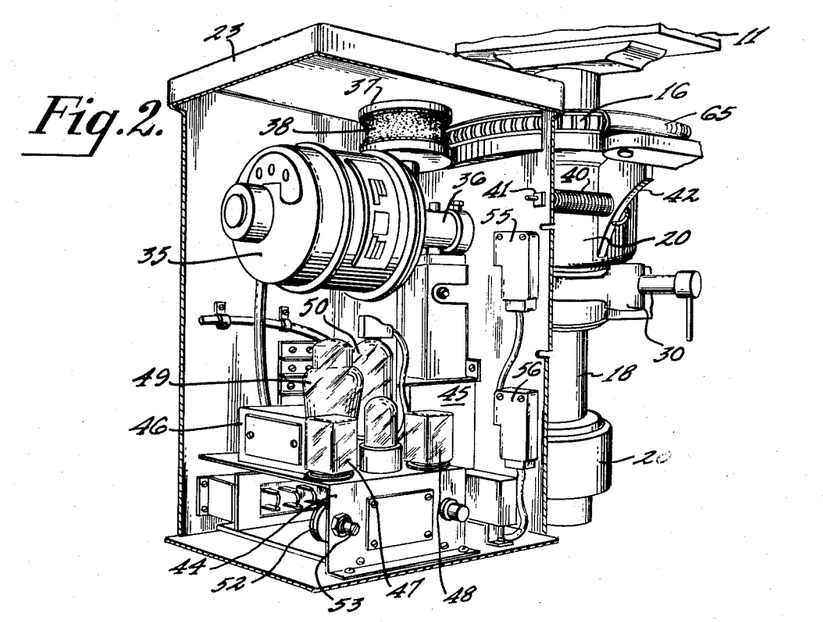
Figure 2 is an enlarged view, in perspective, of the electronic elevating unit shown in Figure 1, with the casing broken away to show certain details of the interior and of its attachment to the comparator of Figure 1.
Figures 3, 4:
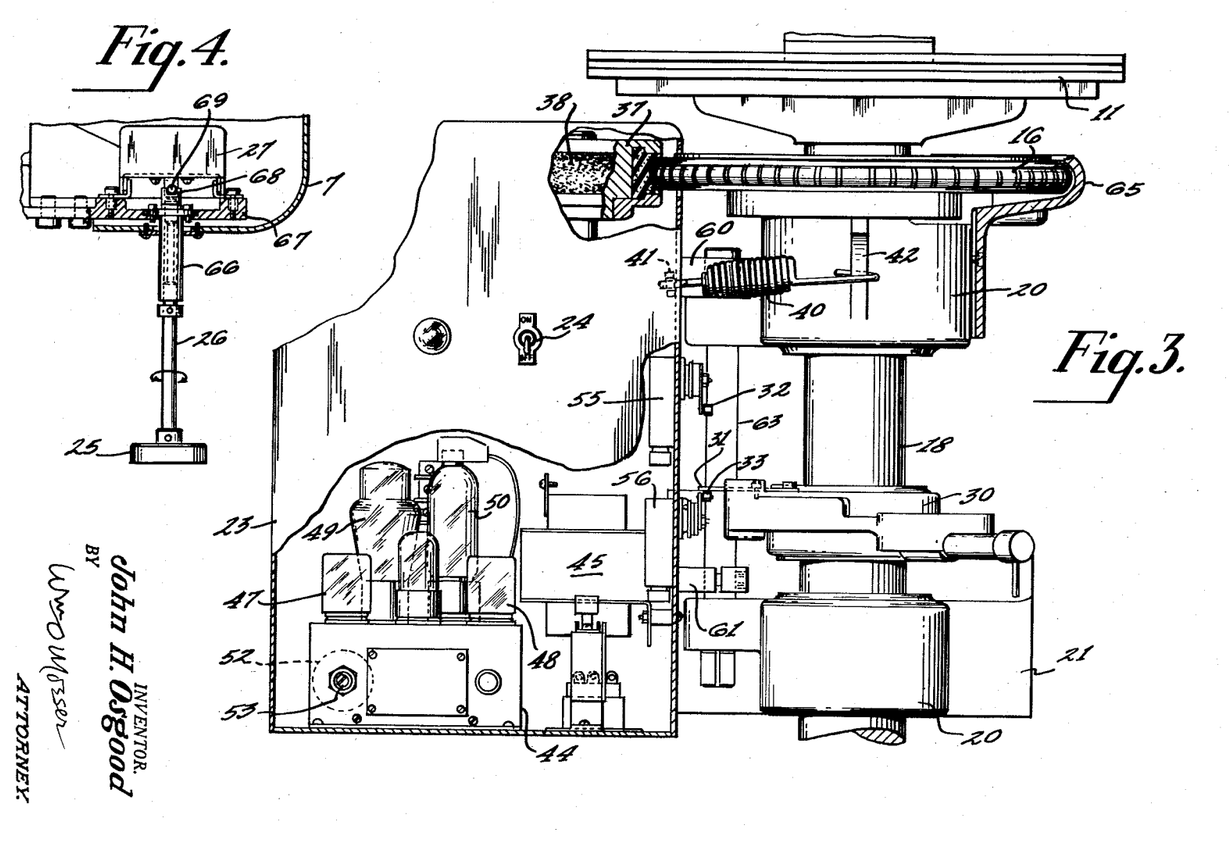
Figure 3 is an enlarged front view in elevation, and with certain portions broken away to show constructional details, of a portion of the comparator and of the elevating unit of Figures 1 and 2.
Figure 4 is a plan view, partly in section, of the control knob and potentiometer unit of Figure 1, showing certain details of construction.

Referring to Figures 2, 3 and 4 along with Figure 1, within the unit 23 is a reversible, variable speed, elevating control motor 35 mounted in a horizontal position and connected through a right angle reduction gear box 36 to a drive pulley 37 arranged with its shaft vertical and parallel with the spindle or table column 18. The pulley is thus in a position directly to engage the periphery of the vertical hand wheel 16 and to drive it in response to operation of the motor. In order to drive the hand wheel more effectively, the drive pulley 37 is provided with a tire 38 of resilient material such as rubber. It will be noted as in Figure 3, that the hand wheel protrudes into the casing of the unit 23 to engage the drive pulley 37.

To insure tight frictional drive between the drive pulley 37 and the hand wheel 16, the unit 23 is pivotally mounted on the side of the bracket 21 of the comparator and is caused to be biased in the direction of the hand wheel by a tension spring 40, which extends into the casing of the unit 23 and is retained by a suitable nut 41 threaded thereon, and at the opposite end is provided with a hook which is secured to a web 42 on the upper bearing 20. By tightening the nut 41 the tension may be increased on the spring and thereby the frictional drive between the pulley 37 and the hand wheel 16 may be increased in effectiveness.

Within the casing of the unit 23, as shown more fully in Figures 2 and 3, is an electronic tube unit having a power transformer 46, a chassis 44 on which are mounted a power supply transformer 45, plug-in relays 47 and 48, a rectifier tube 49 and a grid controlled thyratron tube 50, together with the motor and other circuit elements, including a zero-adjustment potentiometer 52 having a screwdriver adjustment shaft 53.

Also in the unit 23 are the limit switches 55 and 56, for which the operating levers 32 and 33 respectively are shown more clearly in Figure 3. As pointed out in connection with Figure 1, the limit switch actuating plate 31 carried by the spindle clamp or attachment 30, operates in response to extreme movement of spindle or table column 18 to engage the one or the other of the limit switch arms, thereby stopping the drive motor as will be hereinafter described in connection with the circuit diagram of Figure 5.

The manner in which the elevating unit 23 is mounted for pivotal movement in response to the operation of the spring 40 is shown more clearly in Figure 3, wherein it will be seen that an upper bracket 60 and a lower bracket 61, attached to the unit 23, are mounted on the fixed vertical table guide rod 63 carried by the bracket 21 of the comparator. The rod passes freely through the brackets 60 and 61, whereby the unit 23 may move, with the rod 63 as the pivot axis, under the influence of the tension spring 40, to insure driving contact between the pulley 37 and the hand wheel 16. It will also be noted in connection with Figures 1 and 3 that the hand wheel 16 is provided with suitable guard 65.

Referring now to Figure 4, along with Figure 1, the control knob 25 is connected through the control shaft 26 with the potentiometer unit 27 mounted within the casing 7. The shaft 26 is journaled in an elongated bearing 66, in turn secured to a supporting frame 67 within the housing 7. A fork 68 on the end of the shaft engages a lever 69 which operates the potentiometer within the unit 27.

Figure 5:
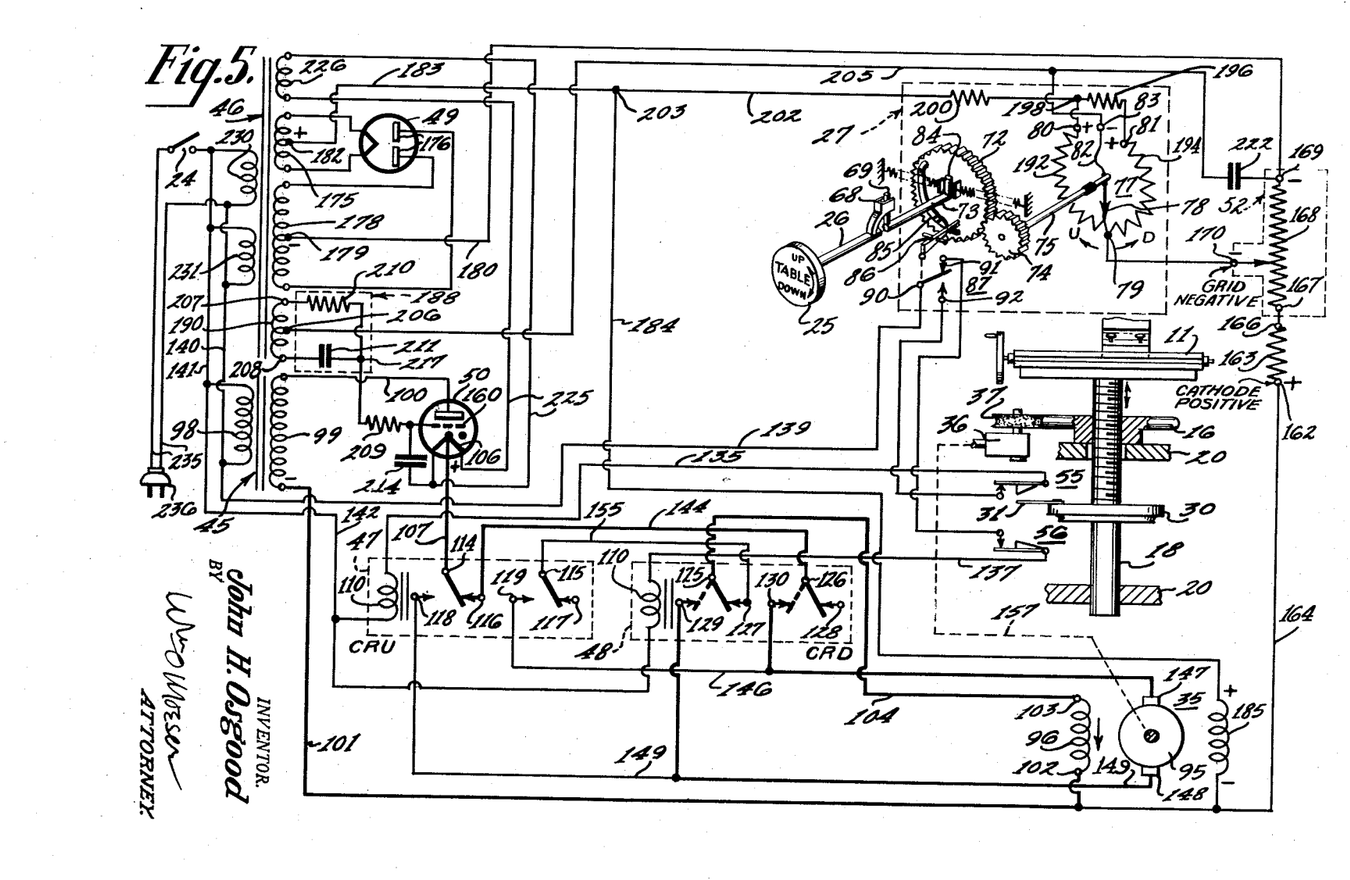
Figure 5 is a schematic circuit diagram of the control and other electrical circuits of the electronic elevating unit shown in the preceding figures, in accordance with the invention.

Referring now to the circuit diagram of Figure 5 along with the preceding figures, the speed control potentiometer unit 27 comprises a small driving gear 72, having a shaft 73 connected with the lever 69 and being thereby coupled to the shaft 26, and a pinion gear 74 driven by the gear 72. The pinion is mounted on a shaft 75 of a speed and direction control potentiometer 77. The moving contact 78 of the potentiometer is operated by the shaft 75 to move from a center or neutral position at a mid tap or terminal 79, along the potentiometer resistor toward the one end terminal 80 or the other end terminal 81. The movable contact 78 is insulated from the shaft 75, as indicated, and connected through a flexible lead 82 with a terminal 83. The ratio of the gearing represented by the pinion 74 and the gear 72 is such that substantially 45 degree rotation of the control knob 25 in either direction is sufficient to move the potentiometer contact 78 through its full substantially 135 degree rotational movement from center terminal to end terminal in either direction against the restoring force of suitable spring centering means 84 connected with the shaft 73.

It will be noted that the gear 72 is provided with a cam element 85 affixed thereto in a position to engage a cam follower or movable control element 86 connected for actuating a two-point switch 87 which serves to control the direction of rotation of the motor, depending upon the direction of movement of the control knob 25. The arrangement is such that if the control knob 25 is moved counterclockwise for "up" movement of the work table 11, the cam 85 immediately engages the cam follower 86 and actuates the switch 87 to change the switching connection of a movable contact 90 from the one fixed contact 91 to the second fixed contact 92, in the example shown in the drawings.

When the control knob 25 is moved in a clockwise direction for "down" operation of the worktable 11, the cam element 85 moves in a direction to remain out of engagement with the cam follower 86 and the switch remains in the position shown in the drawings, with the movable contact 90 in engagement with the fixed contact 91. Any other suitable arrangement of rotation of the control knob 25 may be used.

The driving motor 35 is supplied with operating current or power for the armature 95 and the series field 96 from the power transformer 45, which is connected therewith through the thyratron 50 and one of the relays 47 and 48, depending upon the position of the directional control switch 87.

The transformer 45 comprises a primary winding 98 and a high voltage secondary winding 99, one terminal lead 100 of which is connected to the anode of the thyratron 50 and the other terminal lead 101 of which is connected to one terminal 102 of the series field 96. The current from the series field 96 then flows from the other terminal 103 through a lead 104 and switching connections provided by the relays 47 and 48 for passing the current through the armature 95 in the one or the other direction, and then back to the cathode 106 of the thyratron 50 through a cathode lead 107, thereby completing the current supply circuit through the transformer secondary 99 and the thyratron 50.

The operation of the relays for reversing the current flow through the armature will now be considered. It will be noted that each of these relays includes an operating coil 110 and effectively double-pole, double-throw switching contact means operated by the relay coils. In the relay 47 two movable contacts 114 and 115 are selectively movable from fixed contacts 116 and 117 to fixed contacts 118 and 119, respectively, when the relay coil is energized. Likewise the relay 48 is provided with two movable contacts 125 and 126 which are selectively movable from normal contact with fixed contacts 127 and 128 to fixed contacts 129 and 130, respectively, when the relay coil is energized.

It will be noted that the relay coil of the relay 47 is connected through a lead 135 and the "up" limit switch 55 to the contact 92 of the directional control switch 57. Likewise the operating coil of the relay 48 is connected through a lead 137 and the "down" limit switch 56 to the contact 91 of the directional control switch 87. The movable contact 90 of the switch 87 is connected through a lead 139 to one of a pair of A. C. power supply leads 140—141. The lead 141 is connected through a lead 142 with both of the relay operating coils 110 whereby, through the circuits outlined, alternating current may be applied to one or the other of the relay coils, depending upon the position of the switch 87 and the operation of the limit switches 55 and 56, as will hereinafter appear.

With the control switch 87 in the position shown and with the limit switches 55 and 56 closed, also as shown, it will be seen that the operating coil or winding 110 of the relay 48 will be energized when the supply leads 140—141 are energized from any suitable alternating current source. This will effect closure of the relay 48 with the switch contacts 125 and 126 in the positions shown in dotted lines in the drawing, and this in turn will complete a power supply circuit through the motor armature 95 and the series field 96 in a polarity relation to cause the motor to drive the elevating hand wheel 16 in a direction to lower the table 11.

The circuit through the relay contacts may be traced from the terminal lead 100 of the power supply secondary 99 thence through the thyratron tube 50 and the cathode lead 107 to the movable contact 114 of the relay 47 and the fixed contact 116 thereof, thence through a connecting lead 144 to the movable contact 126 of the relay 48, the fixed contact 130 and a lead 146 which is connected with one of the armature brushes 147 of the motor 35. Current then passes through the armature and from the other brush 148 through a connecting lead 149 to the fixed contact 129 and the movable contact 125 of the relay 48. The latter contact is connected with the lead 104 which carries the current back through the series field 96 by way of the terminal 103 and from the series field terminal 102, the current then flows back to the secondary 99 through the lead 101. Since current flows through the thyratron, the current supplied to the motor is a pulsating direct current.

It will be seen also that when the contacts 125 and 126 of the relay 48 are in the positions shown in full lines, that is, when the relay coil 110 is de-energized as by opening of the limit switch 56, the power supply circuit through the armature and series field as described above, will be opened and the motor will be de-energized. This will more readily be seen by tracing the supply circuit previously outlined, through the cathode lead 107, the relay contacts 114—116, and the connection lead 144 to the contacts 126 and 128 of the relay 48. It will be noted that the contact 128 is not connected to any circuit and therefore provides an open circuit condition for the power supply to the motor.

It will be noted that the power supply circuit for the motor as above traced through the relays and the series field and the armature, provides for current flow through the series field 96 and through the armature 95 in the direction of the arrow which appears adjacent to the series field 96. In other words, the current flow through the motor, when the relay 48 is energized, is downwardly as viewed in the drawings, from the terminal 103 to the terminal 102 of the series field 96, and from the brush 147 to the brush 148 of the armature. When the relay 47 is energized, as when the directional control switch 87 is moved to close the contacts 90 and 92, it will be seen that current for operating the motor will flow in the same direction through the series field and in the opposite direction through the armature.

The above circuit may be traced briefly from the cathode lead 107, through contacts 114—118 of the relay 47 and a connection therefor with the lead 149, thence from the brush 148 upwardly as viewed in the drawing through the armature to the brush 147 and thence back through the lead 146 through contacts 119—115 of the relay 47 and a connection lead 155, to contacts 127—125 of the relay 48 which are connected with the field lead 104. Current then flows from the terminal 103 downwardly as viewed in the drawing through the series field 96 to the terminal 102 and thence through the supply lead 101 back to the negative terminal of the power transformer secondary 99. The motor will thus be operated in the opposite direction when energized through the relay 47 and will cause the table 11 to move in the opposite direction or upwardly.

It will be thus seen that the relay 47 is energized when the contacts 90—92 of the directional control switch 87 are closed and that the relay 48 is energized when the contacts 90—91 are closed. The relay 47 may thus be designated as the "up" control relay and the relay 48 may be designated as the "down" control relay, these designations appearing in the drawing as CRU and CRD which appear adjacent to each of the relays referred to.

In the schematic circuit diagram of Figure 5, the driving connection between the motor armature 95 and the reduction gear box 36 is indicated by the dotted line connection 157. The gear box in turn is shown connected through the driving pulley 37 in contact with the hand wheel 16 and thus to the elevating screw by which the spindle or table column is moved.

The operating current for the elevating control unit is thus applied to the motor to determine its direction of rotation, through operation of the relays 47 and 48. The magnitude of the current at any time is determined by the excitation of the control grid 160 of the thyratron 50 through which the motor operating current must pass from the power supply winding 99 as hereinbefore described. As is well known, a thyratron tube will fire or conduct current when the control grid bias is raised sufficiently from a more negative cut-off value, in a positive direction with respect to the cathode, and when it reaches that particular point the tube will fire and conduct current. The control circuit of the present invention for varying the magnitude of the operating current and the speed of the elevating motor will now be described.

Because of the low resistance of the motor armature and series field, the thyratron cathode 106 may be considered as being substantially directly connected with the lead 101 and with the terminal 162 of a resistor 163 through a connection lead 164 which joins the lead 101. The cathode 106, with the motor in operation, therefore, is only slightly more positive than the terminal 162 and only by the small amount of potential drop through the armature 95 and the series field 96.

The zero-adjust potentiometer 52 is connected with the resistor 163 at a terminal 166, and includes one terminal 167 connected with the terminal 166, a potentiometer resistor 168, an opposite end terminal 169, and a movable potentiometer contact 170 which is movable along the potentiometer resistor 168 from the terminal 167 to the terminal 169 by operation of the control shaft 53 (Figures 2 and 3). It is normally adjusted to an intermediate position as indicated on the drawing.

A direct current potential is developed across the series connected potentiometer 168 and fixed resistor 163 which is utilized to initially bias the control grid 160 of the thyratron 50 with respect to its cathode 106 at or below the "threshold" value. For this purpose, rectified alternating current, in the present example, is caused to flow through the potentiometer resistor and fixed resistor from a voltage supply secondary 178 of the transformer 46 and the rectifier 49. The rectifier anodes 176 are connected to the terminals of the secondary 178 and the secondary center tap terminal 179 is connected through a supply lead 180 back to the terminal 169 of the potentiometer 168. The secondary 175 is the filament supply secondary for the rectifier 49 and the center tap 182 thereon is connected through a lead 183 and a lead 184 to the shunt field 185 of the motor which, in turn, is connected with the lead 164, all as shown.

With the rectifier 49 in operation, rectified current may be considered to flow from the terminal 182 of the filament winding 175, thence through the leads 183 and 184, through the shunt field 185 and the lead 164, from which it then flows through the resistor elements 163 and 168 and back through the terminal 169 and the lead 180 to the center tap 179 of the secondary winding 178.

With this arrangement, the shunt field is energized with rectified current which flows serially through it, the potentiometer resistor 168 and the fixed resistor 163. This provides a potential drop for the zero adjustment or threshold bias of the thyratron with polarity relations as indicated in the drawing. Thus the movable contact 170 is more negative at all times than the terminal 162, and may be made more or less negative between limits represented by the terminals 167 and 169, and always with a fixed negative bias between the movable contact 170 and the terminal 162 as provided by the fixed bias resistor 163. With this arrangement, the shunt field current for the motor is utilized to provide the necessary potential drop for initially or threshold biasing the grid of the thyratron power control tube 50.

As hereinbefore, indicated, the cathode 106 of the thyratron, for biasing purposes, is effectively connected with the positive terminal 162. The grid 160 of the thyratron is connected with the movable contact 170 through two additional sources of control potential, one of which is the directional or positive bias control potentiometer 77, and the other of which is the phase shift network 188 in connection with a source of low voltage alternating current bias supply such as the secondary 190 of the transformer 46. A bias circuit may be traced from the movable contact 170 to the center tap 79 on the potentiometer 77, thence through both potentiometer arms or branches 192 and 194 to the terminals 80 and 81 respectively. In series with the arm 194 and between the terminals 80 and 81 is connected a balancing or "gravity" compensating resistor 196, so that from the terminal 80 to the center tap 79 the current through the branch 194 traverses a higher resistance path than the current through the branch 192 by reason of the series resistor 196.

Following the tracing of the grid circuit from the movable contact 170 further and from the potentiometer 77, it will be seen that a terminal 198 common to the resistor 196 and the terminal 80 is connected through a series voltage reducing resistor 200 and a lead 202 to a terminal 203 in connection with the voltage supply lead 183 from the rectifier 49.

With this circuit arrangement and connection, it will be seen that direct current from the rectifier 49 not only flows through the shunt field and the series bias supply resistors 163 and 168, but also branches at the terminal 203 and flows also through the lead 202, the series resistor 200 to the terminal 198, from which it then flows to the center tap 79, through parallel branch paths provided on one side by the resistor 196 and the potentiometer resistance arm 194 in series, and on the other side by the potentiometer resistance arm 192 alone. From the center tap 79 the current flows through the movable contact 170 and a portion of the potentiometer resistor 168 to the terminal 169 and back to the source of current through the lead 180. Since this current flows between the terminal 169 and the movable contact 170, this additional current flow through the potentiometer 168 does not appreciably change the potential drop between the biasing points provided by the terminals 162 and 170. However, movement of the contact 170 in the direction of the terminal 169 effectively increases the current flow through the potentiometer branches of the potentiometer 77 and, therefore, provides a higher potential drop through each branch proportionally.

The direction of current flow through the potentiometer 77 is such that both terminals 80 and 81 are positive with respect to the center tap 79. The center tap is preferably, but not necessarily, at the electrical center. It may be positioned at any desired intermediate point between the terminals 80—81 depending upon the range of control desired for the table movement. However, it will be seen that as the movable tap 78 on the potentiometer 77 is moved from the terminal 79 in the direction of either of the terminals 80 or 81, the terminal 83 will become increasingly more positive with respect to the terminal 79 and more positive in polarity with respect to the initial biasing potential for the thyratron 50 existing between the terminal 162 and the terminal 170.

The terminal 83 is connected through a lead 205 with a center tap 206 on the transformer secondary 190, and the end terminals 207—208 of the secondary are connected through the phase shifting network 188 and a series grid resistor 209 with the control grid 160 of the thyratron.

The phase shifting network in the present example comprises a resistor 210, of the order of 47,000 ohms, and a capacitor 211, of the order of .05 mfd., series connected across the secondary 190 between the end terminals 207 and 208 thereof. The junction 217 of the series connection between the resistor 210 and the capacitor 211 is connected through the series resistor 209 and with the grid 160 as shown. This may have a resistance of 0.1 megohm, for example. A small stabilizing capacitor 214 of 500 mmfd. is connected between the grid and the cathode as shown. Likewise, a stabilizing capacitor 222, of the order of 16 mfd. is connected between the lead 205, that is the terminal 83, and the terminal 169 of the control potentiometer 168.

The values of other circuit components for the embodiment of the invention shown, include a resistance of 50,000 ohms for the potentiometer 77, with 1500 ohms resistance for the gravity compensating resistor 196, while the negative bias potentiometer has a value of 100 ohms, with the series resistor 163 of 100 ohms. The series resistor 200 may have a value of 1500 ohms in the circuit shown. For other tubes and conditions of operation, circuit components having other suitable values may be used. In the present example, it may be considered that the rectifier tube 49 is a type known commercially as an 83 and the thyratron rectifier is a type known commercially as a C3J.

The thyratron cathode 106 is of the direct filament type having a center tap and is energized through supply leads 225 from a filament supply secondary 226 on the transformer 46. The primary 98 of the power transformer 45 is connected with the A. C. power supply leads 140—141 as shown. The transformer 46 is provided with a pair of primary windings 230 and 231 connected in parallel with the alternating current supply leads 140 and 141 as shown. Both the transformer 45 and the transformer 46 are energized through the power switch 24 which is connected in one side of a power cord connection 235 for the leads 140 and 141 as shown. When the plug 236 on the end of the power cord is connected with a commercial alternating current outlet (not shown) and the power switch 24 is closed, the system is then energized through energization of the transformers 45 and 46 and the various circuits connected therewith as described. The operation of the elevating control motor 35 is then entirely under control of the operating knob 25, movement of which determines the direction of current flow through the motor armature and its direction of rotation, and the bias on the thyratron in magnitude and phase, determines the magnitude of current flow and the speed of operation as will further be described.

The operation of the relays for determining the direction of operation of the motor has been described. The manner in which the grid bias of the thyratron is controlled will now be considered further for a full understanding of the operation of the system. With the grid circuit described, it will be seen that when the motor is in operation and the cathode of the thyratron is effectively connected with the terminal 162, an adjustable negative grid bias between the terminal 162 and the adjustable contact 170 is provided by the resistors 163 and 168. This is the minimum negative bias required for operation of the thyratron grid 160 below cut-off when excited by the alternating current voltage or bias. A portion of this negative bias is fixed, being provided between the terminal 167 and the terminal 162 by the fixed resistor 163 included between these terminals. As the potentiometer contact 170 is moved toward the more negative terminal 169, the initial or zero-adjust bias on the grid 160 of the thyratron 50 is made more negative with respect to the cathode. It may thus be moved into a region of negative bias at which the thyratron is prevented from firing on the positive halfwave peaks of the A. C. bias. As the potentiometer contact 170 is moved in a direction toward the more positive terminal 167, a point is reached at which the thyratron will start to fire on each positive halfwave of anode and grid potential if in proper phase. The potentiometer contact 170, which is included in the zero-adjust control means or potentiometer 52 of the electronic elevating unit, is adjusted by the shaft 53 (Figures 2 and 3), to regulate the width of the "off" zone of the control knob 25. Turning the shaft 53 in a counterclockwise direction decreases the initial negative bias and the width of the "off" zone, and clockwise increases both the negative bias and the "off" zone width. With the system energized and with the speed control knob 25 in its center or "off" position, the zero-adjust control shaft 53 is moved (counterclockwise) until the thyratron 50 just starts to glow slightly, and is then backed off clockwise until the glow disappears. At this setting the elevating unit is responsive to the slightest movement of the speed control knob and the "off" zone is at its minimum.

The operation just described serves to move the potentiometer contact 170 in the direction of the terminal 167 to decrease the negative bias to the point where the tube 50 glows on each positive half cycle of applied A. C. grid voltage and then the negative bias is slightly increased to cut-off the glow or static current flow. It will be seen that if the potentiometer contact 170 is moved in a more negative direction beyond the required threshold bias, this must be overcome before the tube will start to pass current. Thus, the "off" zone for the control knob 25 is increased in width as will be seen from the following description of the control or operating bias circuit.

The additional bias provided by the speed control potentiometer 77 is serially in the bias system and is in a positive direction regardless of whether the contact 78 is moved in one direction or the other. Thus, as the contact is moved from the center terminal 79, additional positive bias is applied to the thyratron grid 160 and overcomes the initial zero-adjust bias provided by the potentiometer 52 and the fixed bias resistor 163, and the tube 50 will conduct current.

The degree to which it conducts current is determined by the amount the grid is biased in a positive direction and by the potential supplied by the alternating current source 190 through the phase shift network 188 interposed between the bias supply lead 205 and the grid 160. This further depends upon the phase relation of the alternating voltages derived from the grid control winding 190 and the secondary 99 or power source for the motor, and will best be understood with reference to the graphs shown in Figures 6 and 7, to which attention is now directed along with Figure 5.

The plate or anode voltage on the thyratron 50 is represented by the sine-wave curve 240 with respect to a zero voltage axis 241. It will be noted that the positive peaks 243 are displaced with respect to the positive peaks 245 of a similar sine wave 246 representing the applied alternating current grid voltage which is drawn with respect to a parallel zero voltage axis 247 immediately below the sine wave 240. The distance marked "Phase Shift" between the first positive peak of the wave 240 and the first positive peak of the wave 246, represents the phase shift between the alternating power voltage applied to the thyratron anode and the alternating biasing voltage applied to the thyratron grid. In other words, the sine wave 246 represents the grid voltage and the sine wave 240 represents the plate voltage of the thyratron 50 in operation. It will be seen that if the grid is biased negatively, the alternating grid voltage positive half waves may be made to remain below the zero axis 247 or below a value where conduction will occur. As the grid bias voltage is made less negative as in Figure 6, the positive half wave peaks will come into the positive range above the zero axis as at a point indicated at 250, for example. Projecting this point upwardly on the plate voltage curve 240, for each positive half wave it will be seen that conduction will take place as represented by the shaded areas 251 and 252 under the curve 240 and above the zero axis. In other words, current flows from a point 255 corresponding to the point 250, to the point 256 where the plate voltage on the positive half cycle passes through zero. However, if as above mentioned, the grid bias as provided initially by the setting of the potentiometer 170 is sufficiently negative the A. C. grid voltage curve 246 may be brought near or below the zero axis 247 and this is the condition for initial adjustment of the system with the motor at rest and the control knob 25 centered or at zero.

Figure 6:
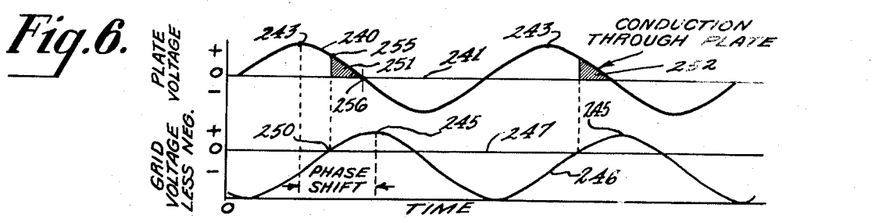
Figures 6 and 7 are graphs showing curves illustrating the operation of a portion of the control circuit shown in Figure 5, in accordance with the invention.
Figure 7:
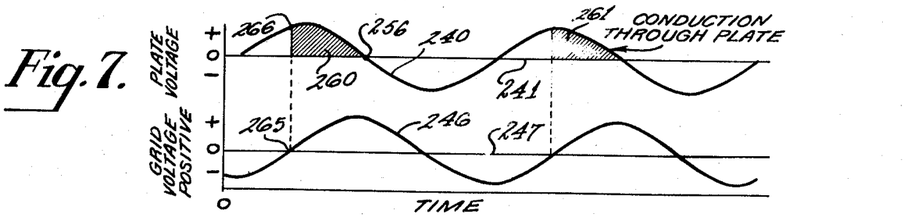

Figure 7 shows the same plate voltage sine wave 240 and grid voltage sine wave 246 in the same phase shift relation but with the grid voltage more positive than in Figure 6. This results in a greater period of conduction on each positive half cycle through the thyratron plate as indicated by the shaded areas 260 and 261. In this case the grid is positive for a greater length of time during each positive half cycle of the plate voltage and therefore a heavier current is applied to the motor, thereby increasing its speed proportionally. In the case of the conditions shown in Figure 7, the cut-off point 256 due to plate voltage passing through zero is the same but the initial starting point is earlier as indicated by the initial cross-over point for the A. C. grid voltage indicated at 265 and the resulting earlier starting of the plate current indicated by the point 266.

From the foregoing description it will be seen that the manual control knob 25 may be moved in direction and degree, from a neutral or "off" position to provide vertical movement of the table, or the work to be inspected, rapidly and precisely to a desired position, substantially without effort and with a "feel" or sense of direction and speed to the extent that the knob is moved from the neutral or "off" position. The improved electronic control circuit provides automatically for moving the table and the work in response to movement of the single manual control element.

It will further be seen that the circuit and the equipment provides for reliability in operation and is further adapted for construction as a single unit for attachment to existing comparator and like equipment, the control potentiometer system alone being located at any convenient position from which it is electrically connected with the unit.

Thus the electronic elevating unit is substantially a self-contained electronically controlled motor drive attachment adapted for raising or lowering a work table or any device of that type which is subject to loading to a greater degree when moving in one of two directions. For optical comparators and the like it provides an installation for quickly meeting conditions requiring constant change and frequent adjustments of the vertical table position. With the system described, the position of the table is easily and precisely adjusted, up or down, by operation of a small speed control lever or knob, and through the improved circuitry employed, this control provides the sensitivity required for extremely delicate final adjustment without in any way sacrificing rapidity of movement when desired.

What is claimed is:

1. An electronic table elevating unit for optical comparators and the like, comprising a reversible electric motor, means for coupling said unit with a comparator for moving the table up and down in response to operation of the motor, a manually movable control element having a neutral position from which it is movable and to which it is normally biased, an electrical control circuit for operating said motor in direction and speed corresponding in direction and degree of movement of said control element from said neutral position, said electrical control circuit including a grid controlled rectifier connected with said motor to supply operating current thereto, means for applying a threshold negative grid bias to said rectifier to cut off operating current to the motor, a speed control potentiometer operatively connected with said movable control element for varying the grid bias in a positive direction to apply operating current to the motor, said speed control potentiometer comprising a center-tapped resistor providing two resistance branches between the center tap and the terminal ends thereof and a movable contact responsive to movement of said control element in either direction from the center tap, means for applying alternating current anode and grid voltage to said rectifier in out-of-phase relation, and means in circuit with said potentiometer for adjusting the operating current to different values and equalizing the speed of movement of the table up and down for the same degree of movement of said control element, said last named means comprising a compensating impedance element in circuit with one branch of said potentiometer.

2. In an optical comparator, the combination with an elevating handwheel for controlling the vertical positioning of a work table, of a reversible electric motor, speed reducing means coupling said motor with said handwheel for driving said handwheel in either direction to raise and lower the work table, a manually movable table control element having a neutral position of rest, and an electrical speed and direction control system for said motor including a speed control potentiometer connected with said control element, said potentiometer comprising two resistance branches on either side of a center tap and a contact movable by said control element from said center tap along either of said branches, means for applying direct current through said resistance branches to the center tap thereby to effect a potential drop across each branch of the potentiometer on either side of the center tap, a resistor in circuit with one branch of said potentiometer to reduce the current flow therethrough and the potential drop thereacross, means including a grid controlled rectifier for applying operating current to the motor, said rectifier having a plate electrode, a control grid and a cathode, means providing a bias circuit connection from said cathode to the center tap of said potentiometer and from the control grid to the movable contact of said potentiometer, means interposed in circuit between the cathode and the center tap of the potentiometer providing a source of variable negative biasing potential for the rectifier whereby threshold operation is obtained, and a source of alternating current bias including a phase shift network connected in circuit between the control grid and the movable contact of said potentiometer device.

3. A table elevating control system for optical comparators and the like, comprising in combination, a variable speed electric motor, speed reduction gearing means connected with the motor and adapted to engage and drive a table elevating control element of said comparator, alternating current power supply means for said motor including a grid controlled rectifier, means for applying an alternating grid voltage to said rectifier in out-of-phase relation to the alternating current supply for the motor through the rectifier, means providing bias voltage for the rectifier including a zero-adjust threshold bias potentiometer and a speed control potentiometer connected with said rectifier, said speed control potentiometer having a neutral position from which it is movable to apply a variable positive grid bias to said rectifier in opposition to threshold negative bias provided by said first named potentiometer thereby to control the current supply to and the speed of the motor, means responsive to movement of the speed control potentiometer in one direction for reversing operation of the motor, and means connected in circuit with said potentiometer for modifying the variable bias applied to the rectifier when moved in one direction from the neutral position, thereby to compensate for gravity preloading of the table.

4. The combination with an optical comparator, of a reversible electric motor for driving the table thereof in either direction, means providing an alternating current power supply circuit for the motor including a grid controlled rectifier having a control grid, a cathode and a plate electrode, means including a phase shift network in circuit between the cathode and control grid for applying an alternating grid voltage to said rectifier in out-of-phase relation to the supply for the motor through said rectifier, means including a zero-adjust potentiometer in circuit between said control grid and cathode for establishing a predetermined threshold negative bias on said grid for cut off of the positive half wave peaks of said alternating current supply, means including a speed control potentiometer in circuit between said grid and cathode for applying a positive operating bias to said grid in opposition to said threshold bias in varying degree to effect rectification of the positive half waves of the alternating supply and operation of the motor at variable speed, means responsive to operation of said speed control potentiometer in one direction for effecting reversal of operation of the motor, and means in circuit with said potentiometer for adjusting the applied positive operating bias to different values for up and down operation, thereby to effect equalization of the speed of movement of the table up and down for the same degree of movement of said control element in either direction.

5. An electronic table elevating unit for optical comparators and the like, comprising a reversible electric motor, means for coupling said unit with a comparator for moving the table up and down in response to operation of the motor, a manually movable control element having a neutral position from which it is movable and to which it is normally biased, an electrical control circuit for operating said motor in direction and speed corresponding in direction and degree of movement of said control element from said neutral position, said electrical control circuit including a grid-controlled rectifier connected with said motor to supply operating current thereto, means for applying a threshold negative grid bias to said rectifier to cut off operating current to the motor, a speed control potentiometer comprising a center tapped resistor having terminal ends connected to provide two resistance branches between the center tap and said terminal ends, said potentiometer being connected in the motor control circuit such that said two resistance branches form a parallel resistance combination across which a voltage drop is developed and having a contact movable along either branch from said center tap in response to movement from the neutral position of said movable control element with which said contact is operatively connected for varying the grid bias in a positive direction to apply operating current to the motor, means for applying alternating current anode and grid voltage to said rectifier in out-of-phase relation, and means comprising a compensating impedance element in circuit with one branch of said potentiometer for adjusting the operating current to different values and equalizing the speed of movement of the table up and down for the same degree of movement of said control element from the neutral position.

References Cited in the file of this patent

UNITED STATES PATENTS

| | | |
|---|---|---|
| 1,394,763 | Scott | Oct. 25, 1921 |
| 1,979,561 | Lewis | Nov. 6, 1934 |
| 2,519,339 | Avery | Aug. 22, 1950 |
| 2,525,500 | Puchlowski | Oct. 10, 1950 |
| 2,674,706 | Knosp et al. | Apr. 6, 1954 |